US009852312B2

(12) United States Patent
Thibault et al.

(10) Patent No.: US 9,852,312 B2
(45) Date of Patent: Dec. 26, 2017

(54) GENERIC ENCRYPTION SYSTEM FOR NONSECURE DATAPATHS

(71) Applicant: Synopsys, Inc., Mountain View, CA (US)

(72) Inventors: Jean-Pierre Thibault, Ottawa (CA); A. A. Jithra Adikari, Ottawa (CA)

(73) Assignee: Synopsys, Inc., Mountain View, CA (US)

( * ) Notice: Subject to any disclaimer, the term of this patent is extended or adjusted under 35 U.S.C. 154(b) by 0 days.

(21) Appl. No.: 14/489,602

(22) Filed: Sep. 18, 2014

(65) Prior Publication Data

US 2016/0085993 A1    Mar. 24, 2016

(51) Int. Cl.
| | | |
|---|---|---|
| *G06F 21/00* | (2013.01) | |
| *G06F 21/64* | (2013.01) | |
| *G06F 21/60* | (2013.01) | |
| *H04L 9/06* | (2006.01) | |

(52) U.S. Cl.
CPC ............ *G06F 21/64* (2013.01); *G06F 21/606* (2013.01); *H04L 9/065* (2013.01)

(58) Field of Classification Search
CPC ..... G06F 21/10; G06F 21/85; H04L 63/0464; H04L 63/0823; H04L 2209/60; H04N 21/4405; H04N 21/4408
USPC ......................................................... 713/189
See application file for complete search history.

(56) References Cited

U.S. PATENT DOCUMENTS

| | | | | |
|---|---|---|---|---|
| 2007/0220279 | A1* | 9/2007 | Northcutt .......... | H04L 25/03159 713/193 |
| 2012/0023331 | A1* | 1/2012 | Altmann .......... | H04N 21/43635 713/168 |
| 2013/0212696 | A1* | 8/2013 | Devanand ............... | H04L 63/10 726/26 |
| 2013/0230296 | A1* | 9/2013 | Yun ....................... | G06F 21/606 386/230 |
| 2014/0211941 | A1* | 7/2014 | Oh .......................... | G06F 21/10 380/201 |

\* cited by examiner

*Primary Examiner* — Syed Zaidi
(74) *Attorney, Agent, or Firm* — Jaquez Land Greenhaus LLP; Bruce W. Greenhaus, Esq.

(57) ABSTRACT

A secure generic encryption system for nonsecure datapaths comprises a format-specific adaptation layer/data path for receiving and processing nonsecure content data; an authentication engine located within a security perimeter and coupled to an external communication interface for authentication and supplying the format-specific adaptation layer/data path, located outside the security perimeter, with an output signal indicating whether authentication is successful; and a generic encryption module located within the security perimeter and coupled (1) to the authentication engine for receiving from the authentication engine initialization vectors, encryption keys, and the output signal indicating whether authentication is successful, and (2) to the format-specific adaptation layer/data path for (a) receiving a read signal from the format-specific adaptation layer/data path, and (b) providing the format-specific adaptation layer/data path with a data-available signal to indicate whether data is available to be read.

6 Claims, 1 Drawing Sheet

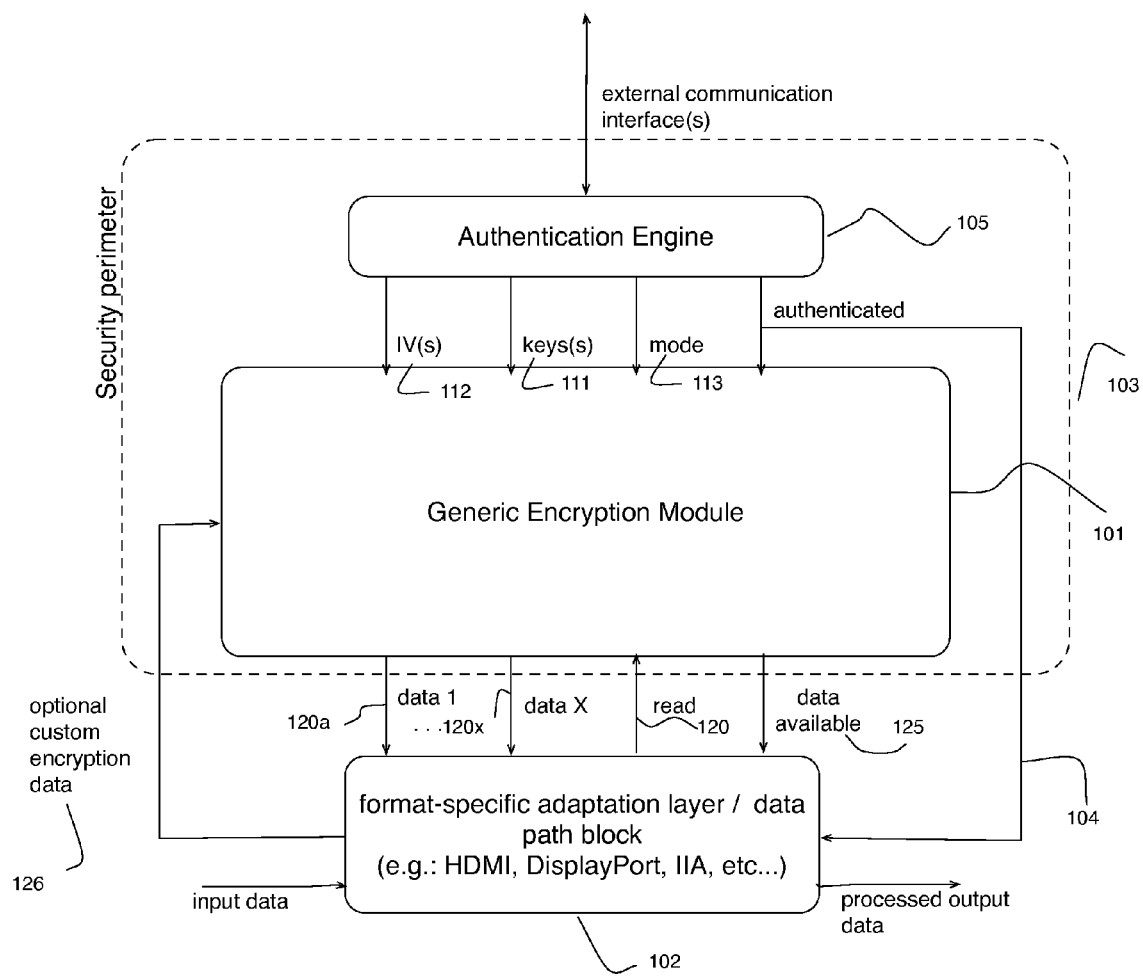

GENERIC ENCRYPTION SYSTEM FOR NONSECURE DATAPATHS

FIELD OF THE INVENTION

The present disclosure relates to encryption and content protection for nonsecure datapaths.

SUMMARY

In accordance with one embodiment, a secure generic encryption system for nonsecure datapaths comprises a format-specific adaptation layer/data path for receiving and processing data which is to be encrypted and/or decrypted; an authentication engine located within a security perimeter and coupled to an external communication interface for authentication and supplying the format-specific adaptation layer/data path, located outside the security perimeter, with an output signal indicating whether authentication is successful; and a secure generic encryption module located within the security perimeter and coupled (1) to the authentication engine for receiving from the authentication engine initialization vectors, encryption keys, and the output signal indicating whether authentication is successful, and (2) to the format-specific adaptation layer/data path for (a) receiving a read signal from the format-specific adaptation layer/data path, and (b) providing the format-specific adaptation layer/data path with a data-available signal to indicate whether data is available to be read.

In one implementation, the generic encryption module provides the format-specific adaptation layer/data path with encrypted data and the format-specific adaptation layer/data path may optionally provide the generic encryption module with custom encryption input data that is format-specific. The authentication engine may provide the generic encryption module with a mode input.

The foregoing and additional aspects and embodiments of the present disclosure will be apparent to those of ordinary skill in the art in view of the detailed description of various embodiments and/or aspects, which is made with reference to the drawings, a brief description of which is provided next.

BRIEF DESCRIPTION OF THE DRAWINGS

FIG. 1 is a block diagram of a generic encryption system for HDCP content data.

While the present disclosure is susceptible to various modifications and alternative forms, specific embodiments or implementations have been shown by way of example in the drawings and will be described in detail herein. It should be understood, however, that the disclosure is not intended to be limited to the particular forms disclosed. Rather, the disclosure is to cover all modifications, equivalents, and alternatives falling within the spirit and scope of an invention as defined by the appended claims.

DETAILED DESCRIPTION

There are seven distinct High-bandwidth Digital Content Protection HDCP 2.x specifications, each for a different audio/visual (A/V) transport mechanism: DisplayPort (DP), High-Definition Multimedia Interface (HDMI), Interface Independent Adaptation (IIA), Mobile High-definition Link (MHL), Digital interface for Video and Audio (DiiVA), Wireless Home Digital Interface (WHDI), Wireless High Definition (WirelessHD). They all use the Advanced Encryption Standard (AES) encryption algorithm in counter mode; however the counter is defined slightly differently in each specification.

The different definitions make it difficult to develop a common hardware module for more than one HDCP specifications, while also adhering to the confidentiality and integrity requirements of HDCP.

There is a need for an encryption module which can be used for all HDCP 2.x variants and which supports HDCP's confidentiality and integrity requirements.

Referring to FIG. 1, encryption module 101 can be paired with one or more external format-specific adaptation layer modules and the architecture can be used in the implementation of all HDCP 2.x variants to provide complete separation between the format-specific logic 102 and the elements of the protocol which must be kept confidential. Since the confidential elements of the protocol are kept away from the format-specific logic, the format-specific logic 102 does not need to reside in a trusted security perimeter 103; thus increasing design flexibility.

A key aspect to achieve the security perimeter is in the use of a signal 104 which indicates whether or not HDCP authentication has been achieved (authentication is handled by a separate authentication engine module 105). When authenticated, encryption keys 111 and initialization material 112 are used to encrypt a counter sequence. The external format-specific module uses this sequence to encrypt or decrypt the actual A/V stream. As soon as authentication is lost, the encryption module discards any previously encrypted counters.

One instance of the encryption module can be used to support more than one A/V format.

Optionally, multiple encrypted data outputs may be provided to efficiently support simultaneous processing of multiple streams, which can be required for DisplayPort, WHDI, and DiiVA.

The security perimeter 103 is set such that untrusted format-specific modules may be plugged in without compromising security.

The encryption module 101 has a uni-directional interface with inputs coming from a separate module 105 which implements the HDCP authentication. The authenticated signal 104 is a single-bit signal which indicates whether the system is currently in an authenticated state. If set to 1, then valid key(s) 111 and Initialization Vectors IV(s) 112 are expected on the encryption module 101 inputs. A 0 to 1 transition on the authenticated signal 104 resets the internal block counter which forms part of the AES counter (this is inputCtr in the HDCP specs). In some cases (i.e. DisplayPort) this is all the information that the encryption module needs to encrypt AES blocks. In other cases, additional information from the non-secure side is needed before encryption can begin, which is indicated by the "mode" input 113.

A one (1) to zero (0) transition on the authentication signal causes the encryption module to discard any encrypted blocks that have not yet been retrieved by the non-secure side. The module then waits for authentication to be re-established before generating AES-encrypted blocks again.

The encryption module 101 interfaces with the format-specific adaptation layer 102. One or more data interfaces 120a . . . 120x provide encrypted data. In the case of AES, these are 128-bit encrypted AES words. However, different widths and other encryption algorithms are also possible. The encryption module 101 signals whether data is available to be read with the "data available" signal 125; the adaptation layer fetches data by asserting the "read" signal 120.

For most A/V formats, the adaptation layer generally supplies some information to the encryption module 101. This is pushed over the "optional custom encryption data" interface 126, which is a simple FIFO interface onto which the non-secure side pushes format-specific data. Of the HDCP 2.x formats, DP does not need this interface, but the others (HDMI, HA, MHL, DiiVA, WHDI and WirelessHD) generally do, each in slightly different ways. The "mode" input determines the data that must be pushed onto this interface for example:

HDMI: 38-bit frame number
HA: 32-bit stream counter
MHL: 32-bit stream counter
DiiVA: 32-bit stream counter, audio/video stream selector
WHDI: 64-bit counter, coarse/fine stream selector
WirelessHD: 8-bit stream index and 40-bit secure packet counter For all modes, one FIFO write triggers the encryption module to produce one data block, using the supplied data, as per the respective HDCP specifications.

DP is unique among the HDCP 2.x protected formats in using a single-bit "Type" variable in the encryption of the data. The Type variable composes part of the IV used for the AES encryption. Since DP allows for multiple streams to be carried over a single physical interface, each with their own Type, two encrypted counter streams are required to encrypt/decrypt the DP data (one encrypted stream with Type set to zero (0), another one with Type set to one (1)).

Since both Type streams for DP use a common encryption key, it is possible to economize on HW resources by sharing the AES key expansion logic between the two encryption streams.

To generalize, for example, only two Type values are currently defined for DP, but Type is actually an 8-bit field; therefore other values of Type may be defined in the future, and the embodiment described can support it. The different encryption streams can share a common key or have distinct keys.

The encryption module can be extended to multiple authentication sessions supporting several instances of AN streams.

This description is specific to the HDCP 2.x specs but it is also applicable to any other standards or protocols used for authentication, cryptographic algorithms and other AES modes other than AES-CTR.

Although the algorithms described above including those with reference to the foregoing flow charts have been described separately, it should be understood that any two or more of the algorithms disclosed herein can be combined in any combination. Any of the methods, algorithms, implementations, or procedures described herein can include machine-readable instructions for execution by: (a) a processor, (b) a controller, and/or (c) any other suitable processing device. Any algorithm, software, or method disclosed herein can be embodied in software stored on a non-transitory tangible medium such as, for example, a flash memory, a CD-ROM, a floppy disk, a hard drive, a digital versatile disk (DVD), or other memory devices, but persons of ordinary skill in the art will readily appreciate that the entire algorithm and/or parts thereof could alternatively be executed by a device other than a controller and/or embodied in firmware or dedicated hardware in a well known manner (e.g., it may be implemented by an application specific integrated circuit (ASIC), a programmable logic device (PLD), a field programmable logic device (FPLD), discrete logic, etc.). Also, some or all of the machine-readable instructions represented in any flowchart depicted herein can be implemented manually as opposed to automatically by a controller, processor, or similar computing device or machine. Further, although specific algorithms are described with reference to flowcharts depicted herein, persons of ordinary skill in the art will readily appreciate that many other methods of implementing the example machine readable instructions may alternatively be used. For example, the order of execution of the blocks may be changed, and/or some of the blocks described may be changed, eliminated, or combined.

It should be noted that the algorithms illustrated and discussed herein as having various modules which perform particular functions and interact with one another. It should be understood that these modules are merely segregated based on their function for the sake of description and represent computer hardware and/or executable software code which is stored on a computer-readable medium for execution on appropriate computing hardware. The various functions of the different modules and units can be combined or segregated as hardware and/or software stored on a non-transitory computer-readable medium as above as modules in any manner, and can be used separately or in combination.

While particular implementations and applications of the present disclosure have been illustrated and described, it is to be understood that the present disclosure is not limited to the precise construction and compositions disclosed herein and that various modifications, changes, and variations can be apparent from the foregoing descriptions without departing from the spirit and scope of an invention as defined in the appended claims.

What is claimed is:

1. A method of encrypting data using a generic encryption module located within a security perimeter, said method comprising:
   receiving and processing data in a format-specific adaptation layer module configured to operate in accordance with all of the following types of High-bandwidth Digital Content Protection (HDCP) 2.X specifications: DisplayPort (DP); Multimedia Interface (HDMI), Interface Independent Adaptation (IIA), Mobile High-definition Link (MHL), Digital interface for Video and Audio (DiiVA), Wireless Home Digital Interface (WHDI), Wireless High Definition (WirelessHD), the format-specific adaptation layer module being located outside the security perimeter;
   supplying said format-specific adaptation layer module with an authentication signal from an authentication engine, the authentication signal indicating whether authentication is successful;
   supplying said format-specific adaptation layer module with a data-available signal from said generic encryption module, the data-available signal indicating whether data is available to be read;
   supplying said generic encryption module with initialization vectors, encryption keys, and said authentication signal; and
   supplying said generic encryption module with a read signal from said format-specific adaptation layer module.

2. The method of claim 1 which includes providing said format-specific adaptation layer module with encrypted data from said generic encryption module.

3. The method of claim 1 which includes providing said generic encryption module with custom encryption data that is format-specific, from said format-specific adaptation layer module.

4. The method of claim 1 which includes providing said generic encryption module with a mode input, from said authentication engine.

5. The method of claim 1 in which said format-specific adaptation layer module-includes format-specific logic.

6. The method of claim 1 wherein said data HDCP content data and said authentication is HDCP authentication.

\* \* \* \* \*